United States Patent [19]

Murayama et al.

[11] 4,395,718
[45] Jul. 26, 1983

[54] THERMAL TRANSFER RECORDING MEDIUM

[75] Inventors: Tomio Murayama; Yoshiki Kikuchi; Haruhiko Moriguchi; Takashi Ohmori; Fujio Moriguchi, all of Ebina, Japan

[73] Assignee: Fuji Xerox Co., Ltd., Tokyo, Japan

[21] Appl. No.: 303,270

[22] Filed: Sep. 17, 1981

[30] Foreign Application Priority Data

Sep. 18, 1980 [JP] Japan .............................. 55-128533

[51] Int. Cl.³ .......................................... G01D 15/10
[52] U.S. Cl. ............................................... 346/135.1
[58] Field of Search ...................... 346/135.1, 108, 1.1

[56] References Cited
U.S. PATENT DOCUMENTS 2,799,167  7/1957  Loconti ......................... 346/135.1 X
2,826,511  3/1958  Messinger .................... 346/135.1 X
3,792,481  2/1974  Nagashima et al. ................ 346/1.1

Primary Examiner—Donald A. Griffin
Attorney, Agent, or Firm—Sughrue, Mion, Zinn, Macpeak and Seas

[57] ABSTRACT

A thermal recording medium has two or more kinds of thermo sensitive ink on a base member thereof, and each of the inks has a different melting point and a different color. At least one of the inks also contains an achromatizing agent for concealing a color of at least one of the inks. The thermal transfer recording medium thus constructed is capable of producing multiple colors on a recording sheet by utilizing a device having only one heating head.

8 Claims, 6 Drawing Figures

THERMAL TRANSFER RECORDING MEDIUM

BACKGROUND OF THE INVENTION

1. Field of the Invention

This invention relates to a thermal transfer recording medium for transferring and recording an image to a recording sheet.

2. Description of the Prior Art

In recording a color image by using a thermo sensitive ink donor sheet, it has been customary to use thermo sensitive ink donor sheets having a low melting point for transferring black. It has also been customary to use thermo sensitive recording sheets that produce a red color when heated to a specific temperature which is higher than the thermo sensitive ink's melting point.

The prior art device utilizing such a prior art thermo sensitive ink donor sheet and thermo sensitive recording sheet is shown in FIG. 1.

The first heating head 3 heats the thermo sensitive ink donor sheet 2 to a temperature above the melting point of the ink thereon thereby transferring an ink pattern onto the thermo sensitive recording sheet 1. The thermo sensitive recording 1 then passes between a second roll 6 and a second heating head 4 which heats the recording sheet 1 to the temperature required to produce the red ink pattern. Reference symbol α denotes a direction of travel of the thermo sensitive recording sheet.

In the system described above, two or more heating heads are necessary, and the recorder including the required control devices is complicated in structure. Thus, the recorder is costly to manufacture in making the final print. There is a chance of the print thus formed being altered later by again heating the recording sheet 1.

SUMMARY OF THE INVENTION

It is accordingly an object of the present invention to provide a thermal transfer recording medium having an improved structure so that a print having a color pattern thereon is obtained by a device simple in structure and wherein there is no likelihood of the color pattern thus formed being altered.

To attain these and other objects, the present invention provides a thermal transfer recording medium which has two or more kinds of thermo sensitive ink having different colors and different melting points which is applied to a base member of the recording medium in the form of a mosaic. The heat recording medium thus prepared is capable of producing a color image on plain paper by a single heating head.

In a further embodiment, one or more of the two or more kinds of thermo sensitive ink contains an achromatizing agent to conceal one or more of the inks when the heat recording medium is heated to a predetermined temperature to also allow a color pattern to be produced on a plain recording sheet by a single heating head.

DESCRIPTION OF THE PREFERRED EMBODIMENTS

Figure 1:
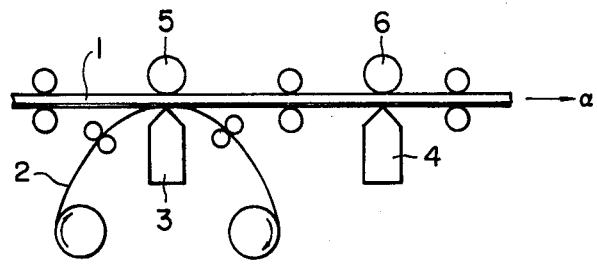
FIG. 1 is a schematic view of a thermo sensitive recorder using a conventional thermo transfer recording medium.
Figure 2:
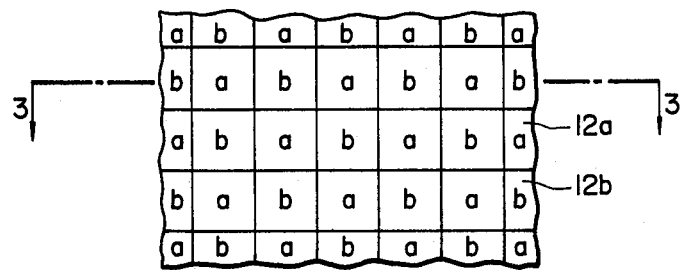
FIG. 2 is a plan view of a first embodiment of the present invention.
Figure 3:
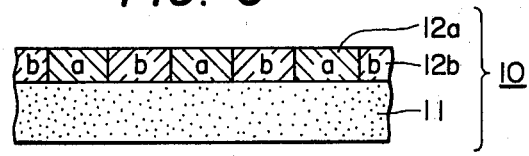
FIG. 3 is a cross-sectional view of the first embodiment of the present invention, taken along lines 3—3 of FIG. 2.

Referring to FIGS. 2 and 3, a thermal transfer recording medium 10 constructed in accordance with the present invention comprises a base member 11, and layers of thermo sensitive ink 12a and 12b having different colors and different melting points. The thermo sensitive inks 12a and 12b are applied in a mosaic form to one surface of the base member 11.

In one example, the thermo sensitive ink 12a is green and the thermo sensitive ink 12b is red. The melting point of the thermo sensitive ink 12a is higher than that of the thermo sensitive ink 12b.

When it is desired to obtain a heat transfer record by using the thermal recording medium 10, energy is applied to heating elements of a heating head (not shown) and the amount of applied energy is controlled by controlling a voltage and pulse width which is applied to the heating elements. The temperature of the recording medium 10 can therefore be selectively controlled.

The thermo sensitive ink having a melting point below the temperature to which the recording medium 10 is heated is transferred from the recording medium to the recording sheet brought into close contact with the recording medium thereby producing a record having a color image. The thermo sensitive ink having a melting point above the temperature to which the recording medium 10 is heated is not transferred to the recording sheet.

Specifically, if the temperature at which the recording medium 10 is heated is higher than the melting point of the thermo sensitive red ink 12b and below that of the layer of thermo sensitive green ink 12a, only the red ink layer 12b is transferred from the recording medium 10 to the recording sheet.

If the temperature at which the recording medium is heated is higher than the melting point of the green ink 12a, and therefore also higher than the melting point of the red ink 12b, red ink 12b and green ink 12a are both transferred to the recording sheet producing a printed black pattern on the recording sheet.

In Table I, compositions and melting points of thermo sensitive ink 12a and 12b used in the first embodiment of the present invention are given.

TABLE I

|     | Binder Carnauba (or Ester) Wax | Color Producing Material, Dyestuff or Pigment | Softener or Lubricating Oil | Melting Point (°C.) |
| --- | --- | --- | --- | --- |
| 12a | 20 | 50 | 30 | 80 |
| 12b | 30 | 50 | 20 | 60 |
|     |    |    |    | (by weight %) |

The thermo sensitive ink 12a was a mixture of cyan and yellow, and the thermo sensitive ink 12b was magenta.

A thermal transfer recording was conducted by using the recording medium 10 having the layers of thermo sensitive ink 12a and 12b having the melting points as given in Table I and applying energy to the heating head. The recording medium 10 was heated by the heating head to a temperature higher than 60° C. but lower than 80° C., and the magenta layer of thermo sensitive ink 12b alone was transferred to the recording sheet.

When the heating temperature was set at above 80° C., the thermo sensitive inks 12b and 12a were both transferred to the recording sheet producing a mixture of yellow-magenta-cyan, namely, a black pattern on the recording sheet.

Figure 4:
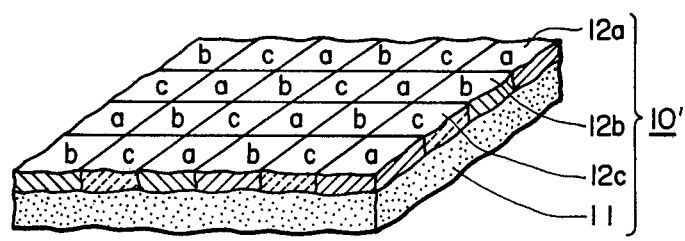
FIG. 4 is a perspective view of a second embodiment of the invention.

FIG. 4 is a perspective view of a second embodiment of the present invention. Thermo sensitive ink 12c having a different color from that of ink 12a and 12b and having a melting point lower than that of ink 12b is provided on the recording medium 10'.

Thermal recording medium 10' having the structure described was used for heat transfer recording by means of the heating head. When the recording medium 10' was heated by the heating head to a temperature higher than the melting point of ink 12c but lower than the melting point of the ink 12b, the ink 12c alone was transferred. When the recording medium 10' was heated to a temperature higher than the melting point of the ink 12b but lower than the melting point of the ink 12a, the ink 12c and the ink 12b were both transferred to the recording sheet.

When the recording medium 10' was heated to a temperature higher than the melting point of the ink 12a, all three inks 12c, 12b and 12a were transferred to the recording sheet. An image of three different colors was thus printed on the recording sheet.

In a further embodiment of the present invention, thermo sensitive ink 12a is red and thermo sensitive ink 12b is blue. The red ink 12a has a higher melting point than that of the blue ink 12b. The red ink 12a also contains an anchromatizing agent which conceals the blue color of the blue ink 12b when the thermal recording medium is heated to a temperature higher than the melting point of the red ink 12a.

In accordance with this embodiment, when the recording medium 10 is heated to a temperature above the melting point of the blue ink 12b but lower than the melting point of the red ink 12a, the blue ink 12b alone is transferred to the recording sheet.

If the recording medium 10 is heated to a temperature which is higher than the melting point of the red ink 12a, then the blue ink 12b and the red ink 12a are both transferred onto the recording sheet. Since the red ink 12a contains an achromatic agent, the color of the blue ink 12b is concealed. Accordingly, the red color alone is recorded on the recording sheet.

Compositions and melting points of thermo sensitive ink 12a and 12b used in the third embodiment are also given in Table I.

Thermal sensitive red ink 12a contains a material which produces red by an acidic dyestuff, and a guanidins derivative for concealing the blue color of the thermo sensitive ink 12b. The blue ink 12b contains a combination of basic achromatic dyestuff and bisphenol alcohol which produces blue.

A thermal transfer recording was carried out by heating the recording medium 10 having thereon two kinds of ink 12a and 12b having different melting points as given in Table I, by means of the heating head. When the recording medium 10 was heated by the heating head to a temperature above 60° C. and below 80° C., the blue ink 12b alone was transferred to the recording sheet, thus reproducing a blue pattern on the recording sheet.

When the recording medium 10 was heated to a temperature above 80° C., the blue ink 12b and the red ink 12a were both transferred, but the blue was concealed due to the effect of the achromatizing agent contained in the red ink 12a resulting in a red pattern being recorded on the recording sheet.

It should be understood that it is possible for the blue ink 12b to contain the achromatizing agent which is adapted to produce an achromatizing effect only when heated to 80° C. in order to conceal the blue color above 80° C.

Figure 5:
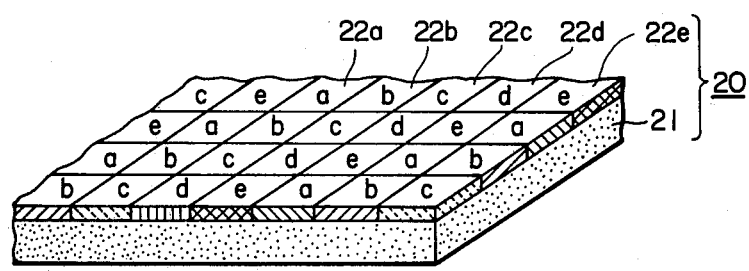
FIG. 5 is a perspective view of yet another embodiment of the invention.

FIG. 5 is a perspective view of yet another embodiment of the invention. A transfer recording medium 20 comprises a base member 21 and five kinds of thermo sensitive ink 22a, 22b, 22c, 22d and 22e having different melting points. All four kinds of ink 22a through 22d contain achromatizing agents.

Melting points and achromatizing points (reaction-starting-point) of these inks are given in Table II.

TABLE II

| Types | 22a | 22b | 22c | 22d | 22e |
|---|---|---|---|---|---|
| Color produced | Cyan (C) | Magenta (M) | Yellow (Y) | Cyan (C) | Black (B) |
| Melting, transfer point | above T1 | above T2 | above T4 | above T6 | above T7 |
| Achromatizing point | above T3 | above T5 | above T7 | above T7 | |

The thermo sensitive ink 22a is cyan C, the ink 22b is magenta M, the ink 22c is yellow Y, the ink 22d is cyan C and the ink 22e is black B. The melting points of these inks have the following relationship:

$$(22a)\ T1 < (22b)\ T2 < (22c)\ T4 < (22d)\ T6 < (22e)\ T7.$$

The achromatizing agent contained in the thermo sensitive ink 22a produces an achromatizing effect which conceals cyan when the recording medium is heated by the heating head above the temperature T3 which is between the melting point T2 of the magenta ink 22b and the melting point T4 of the yellow ink 22c.

The achromatizing agent contained in the magenta ink 22b produces an achromatizing effect which conceals magenta when the recording medium is heated above the temperature T5 which is between the melting point T4 of the yellow ink 22c and the melting point T6 of the cyan ink 22d.

The achromatizing agents contained in the yellow ink 22c and the cyan ink 22d produce an achromatizing effect which conceals both yellow and cyan when the recording medium is heated above temperature T7 which is equal to the melting point of the black ink 22e. The relationship between T1 through T7 is as follows.

$$T1 < T2 < T3 < T4 < T5 < T6 < T7$$

Figure 6:
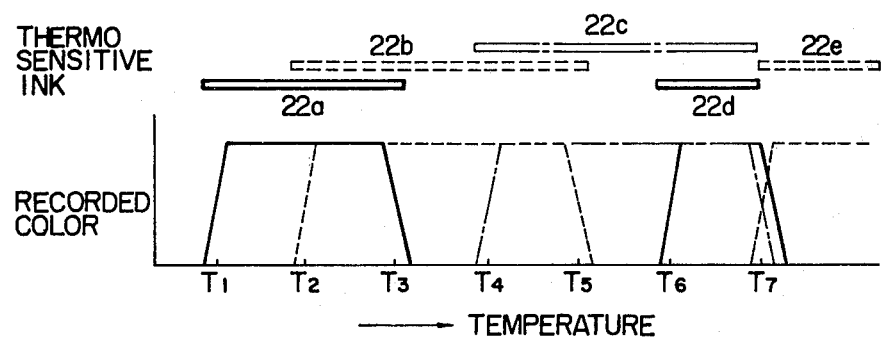
FIG. 6 illustrates the multiple color recording recorded by the thermo sensitive ink used in the embodiment shown in FIG. 5.

FIG. 6 illustrates the multicolor recording which results using the five kinds of ink described above.

When the recording medium 20 is heated to the temperature T1, the cyan ink 22a dissolves and is transferred to the recording sheet to produce a printed blue-green pattern on the recording sheet.

When the recording medium 20 is heated to the temperature T2, the magenta ink 22b dissolves and mixes with the dissolved cyan ink 22a producing a printed blue pattern on the recording sheet.

When the recording medium 20 is heated to the temperature T3, the achromatizing agent contained in the cyan ink 22a conceals the cyan ink 22a resulting in the magenta ink 22b alone being recorded on the recording sheet, producing a printed red-violet pattern on the recording sheet.

When the recording medium 20 is heated to a temperature T4, the yellow ink 22c dissolves, and mixes with the magenta ink 22b, resulting in a red printed pattern being produced on the recording sheet.

When the recording medium 20 is heated to the temperature T5, the achromatizing agent contained in the magenta ink 22b conceals the magenta resulting in the yellow ink 22c alone being recorded on the recording sheet.

When the temperature is raised to T6, the cyan ink 22d dissolves and mixes with the yellow ink 22c producing a green printed pattern on the recording sheet.

When the temperature is raised to T7, the achromatizing agents contained in the inks 22c and 22d conceal the yellow and cyan colors thereof, while the black ink 22e dissolves, producing a blackish printed pattern on the recording sheet.

By using, in combination, various kinds of thermo sensitive inks having different melting points and achromatizing agents (five kinds of thermo sensitive inks were used in the latter embodiment), an eight color pattern is produced if the original color of the recording sheet itself is included.

In this latter example, the achromatizing agent contained in one thermo sensitive ink may act to conceal another thermo sensitive ink, as described in the earlier embodiments. In place of an achromatizing agent, a discoloring agent may be used, in order to produce a desired color.

As is apparent from the foregoing, two or more kinds of thermo sensitive ink having different melting points and colors are applied in a mosaic form to a base member of a thermo transfer recording medium, and one or more of the inks contain an achromatizing agent so as to conceal a desired thermo sensitive ink when the recording medium is heated to a predetermined temperature. By this arrangement, the thermo transfer recording of a multiple color image is achieved by a device simple in construction and by using a plain recording sheet. Since a plain sheet is used as a recording sheet, there is no likelihood that the print obtained will be altered later. In addition, the thermo sensitive ink remains solid at room temperatures, providing ease of treatment.

What is claimed is:

1. A thermal transfer recording medium having a base member, comprising:
   at least two kinds of thermo sensitive ink having different melting points applied to said base member in a mosaic form, and an achromatizing agent contained in at least one of said two or more kinds of thermo sensitive ink, said achromatizing agent being adapted to conceal a desired color when said recording medium is heated to a predetermined temperature.

2. The thermal sensitive recording medium claimed in claim 1 wherein said at least two or more kinds of thermo sensitive ink have different colors.

3. The thermal recording medium claimed in claim 2 wherein said achromatizing agent comprises a discoloring agent.

4. The thermal transfer recording medium claimed in claim 1, 2 or 3 wherein said thermal sensitive inks comprise first, second, third, fourth and fifth inks having melting temperatures T1, T2, T4, T6, and T7 respectively and having predetermined colors, said first ink having an achromatizing agent adapted to conceal said color of said second ink at a temperature between said temperature T2 and T4, said second ink having an achromatizing agent adapted to conceal said color of said third ink at a temperature T5 between said temperature T4 and T6, said third and fourth inks having an achromatizing agent adapted to conceal said third and fourth ink colors respectively at a temperature T8 which is above said temperature T7.

5. The thermal transfer recording medium claimed in claim 4 wherein said first, second, third, fourth and fifth ink colors comprise cyan, magenta, yellow, cyan and black, respectively.

6. A thermal recording medium of the type having at least one layer of thermo sensitive ink having a transfer surface for contacting and transferring ink to a recording sheet or the like, said layer comprising at least two kinds of different thermo sensitive inks having different colors and different respective melting points, said two kinds of thermo sensitive inks being exposed at different respective regions of said transfer surface.

7. The thermal recording medium claimed in claim 6 wherein said kinds of thermal sensitive ink each comprise a binder, a color producing material, and a softner.

8. A thermal recording medium as claimed in claim 6, wherein said at least one layer comprises a mosaic pattern of said at least two kinds of thermo sensitive inks.

* * * * *